United States Patent
Kornrumpf et al.

[11] 3,842,263
[45] Oct. 15, 1974

[54] MOLDED OPTO-ELECTRONIC TRANSDUCER

[75] Inventors: William P. Kornrumpf; John D. Harnden, Jr., both of Schenectady, N.Y.

[73] Assignee: General Electric Company, Schenectady, N.Y.

[22] Filed: Feb. 1, 1973

[21] Appl. No.: 328,529

[52] U.S. Cl.................. 250/239, 250/552, 250/227
[51] Int. Cl............................................. G02b 5/14
[58] Field of Search ........ 250/217 SS, 217 S, 211 J, 250/239, 216, 227, 237, 239, 552, 553; 317/235 N

[56] References Cited
UNITED STATES PATENTS

| | | | |
|---|---|---|---|
| 3,134,906 | 5/1964 | Henker | 250/211 J |
| 3,432,676 | 3/1969 | Lindberg | 250/239 |
| 3,469,103 | 9/1969 | Erpel | 250/239 X |
| 3,483,385 | 12/1969 | Heaslip et al. | 250/237 X |
| 3,639,770 | 2/1972 | Zizelmann | 250/239 X |
| 3,684,889 | 8/1972 | Priessnetz et al. | 250/239 |
| 3,697,762 | 10/1972 | Kurtz | 250/239 |

*Primary Examiner*—Walter Stolwein
*Attorney, Agent, or Firm*—Paul I. Edelson; Joseph T. Cohen; Jerome C. Squillaro

[57] ABSTRACT

A low cost opto-electronic transducer comprises a molded body of material having a pair of depressions therein. A semiconductor light source is located in one of the depressions and a photoresponsive device is located in the other. The molded body may comprise an opaque material, or, alternatively, the surfaces of the depressions may be coated with opaque material. This prevents direct illumination of the photoresponsive device by light emitted by the semiconductor light source. The depressions, and consequently the semiconductor light source and photoresponsive device contained therein, are closely spaced thereby eliminating any requirement for elaborate lens systems for focusing emitted or received light. The resulting product is a simple and inexpensive optical transducer for detecting objects at close ranges.

7 Claims, 3 Drawing Figures

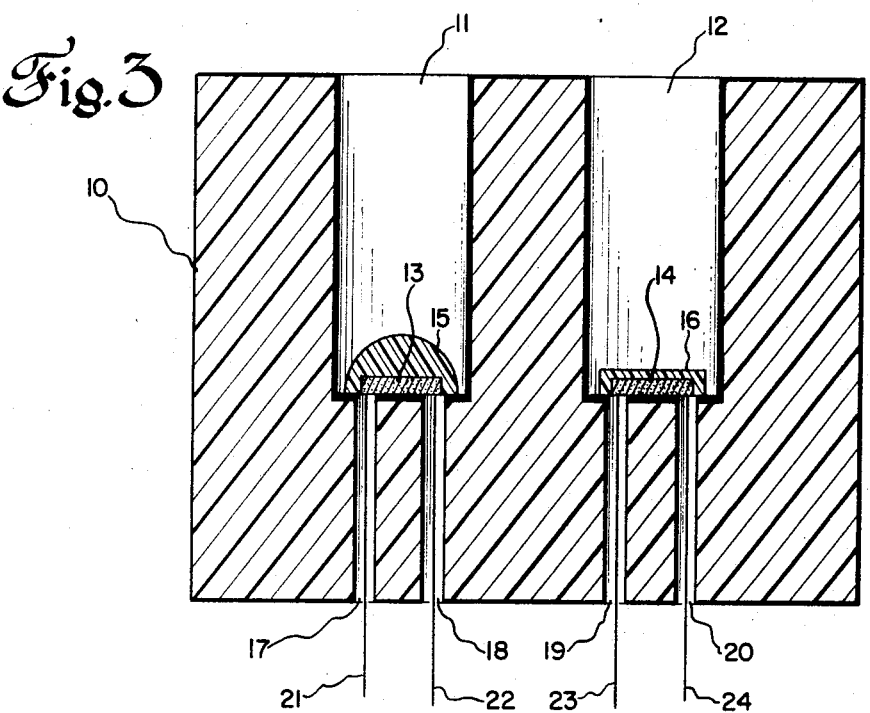

MOLDED OPTO-ELECTRONIC TRANSDUCER

This invention relates to object detectors. More particularly, this invention relates to active optical transducers in which a beam of energy is directed from an energy source toward the location at which an object to be detected is expected and a portion of the energy reflected from the object is collected by a detector whose output is indicative of the presence or absence of the object.

This invention is related to our copending application Ser. No. 302,523, filed Oct. 31, 1972, and to our concurrently filed application Ser. No. 328,530. These related applications are assigned to the assignee of this invention and are incorporated herein by reference thereto.

Optical object detectors, also known as optical transducers, have found utility in a variety of applications. Examples of these applications include the counting and timing of objects passing through a point on an industrial production line for control purposes, systems for counting patrons entering or leaving commercial establishments, automatic door openers, or the like for persons or vehicles, and intrusion detection systems. These systems may be classified, for convenience of reference, as active systems or passive systems, and as direct beam systems or reflected energy systems. Each of these systems is referred to herein as an optical transducer system. It is to be understood that the word "optical" is used herein to refer to any form of electromagnetic energy which is capable of being focused by lenses and which interacts elastically with opaque objects. As a minimum, these optical systems are to be understood to employ electromagnetic radiation in the far infrared, infrared, visible, and ultraviolet portions of the electromagnetic spectrum or in any combination. Similarly, for convenience, the term "light" is used herein to refer to the electromagnetic energy employed in the systems, it being understood that "light" as used herein refers to electromagnetic energy within the spectral range of far infrared to ultraviolet, including, but not limited to, visible light.

Active optical transducer systems are those which include a light source whose emitted energy interacts with the object to be detected. A photodetector receives the energy and provides an output from which is determined whether or not the interaction has taken place and accordingly whether or not the object was present. A passive optical object detection system employs only a photodetector and relies upon perturbation of the ambient light incident on the photodetector by the object to determine whether or not the object is present. In direct beam systems, the object to be detected intervenes between the photodetector and the light source, be the light source ambient or a light emitter included in the system, and the presence of the object is usually indicated by a decrease in the intensity of light incident upon the photodetector. In a reflected energy optical transducer system, the photodetector receives light reflected from the object to be detected and the presence of an object is usually indicated by an increase in the intensity of light incident upon the photodetector; again, the light reflected by the object onto the photodetector may be either ambient light or light from a light source included in the system which is directed onto the object.

Active optical transducers are in general more sensitive than passive optical transducers because, in an active system, light of known spatial, spectral, and intensity characteristics is provided and the photodetector can be constructed to respond specifically to the energy provided. The practically achievable sensitivity of a passive system is limited by the necessity of reducing to an acceptable level false alarms produced by fluctuations in ambient energy level not related to motion of an object to be detected. On the other hand, active systems are in general more expensive than passive systems as a result of the cost of the light source itself, and of the fact that reasonable care is required in optical alignment of the light source and the photodetector. Direct beam systems require that the source of illumination and the photodetector be essentially diametrically opposed across the line of travel of the object to be detected. In some applications, this requirement may be inconvenient. Notably, in some production line control and intrusion detection systems, the requirement that the object to be detected intervene between the source of illumination and the photodetector provides a serious design constraint. In reflected energy systems, on the other hand, the photodetector may be essentially coplanarly located with the illumination source in a plane parallel to the direction of travel of the object to be detected. Since this invention relates to active reflected energy optical transducer systems, further discussion will be limited to such systems.

In prior art active reflected energy optical transducer systems, the light source is typically an incandescent lamp. In a first configuration of prior art systems, the light from the lamp is collimated and directed toward the expected location of an object to be detected by an optical system comprising a reflector, a tube, and a lens system. Light reflected from an object is collected and focused onto a photodetector by a second optical system comprising a tube and lens system. This configuration has the disadvantage of requiring two separate optical systems which are relatively expensive and which must be precisely aligned. In prior art configurations the light source and photodetector cannot share a single telescopic optical system because the physical size of the lens will not permit both the lamp and the photodetector to be sufficiently close to the focal point of a single lens system, nor were point sources nor point detectors available. In another prior art configuration, energy from the lamp is directed onto a half-silvered mirror which reflects it toward the location at which an object to be detected is expected. Light reflected from the object is returned to the half-silvered mirror which transmits it to a photodetector located on the opposite side thereof. This configuration is less expensive than the configuration employing two telescopic optical systems, but still requires critical alignment among the lamp, mirror, and photodetector, and has the further disadvantage of having its sensitivity decreased by a factor of four by the attenuation incident to the use of a half-silvered mirror.

The transducers of our hereinabove referenced copending applications are high sensitivity devices which are usable at fairly long ranges. On the other hand, those transducers must be essentially completely fabricated prior to testing. This results in a situation in which a transducer containing a single defective component is rejected, even though, aside from the single defective component, the unit is capable of functioning properly. This situation may not be economically optimal. The transducer of this invention is suitable for use at short ranges where maximum sensitivity is not required and is simply and inexpensively manufactured using pretested and prepackaged components at substantial cost savings.

Accordingly, it is an object of this invention to provide an active reflected energy opto-electronic transducer in which a unitary molded structure provides support and proper orientation for a semiconductor light source and a photoresponsive device and for preventing direct illumination of the photoresponsive device by light emitted by the semiconductor light source.

Another object of this invention is to provide such a transducer in which the unitary molded body is adapted to receive therein a prepackaged and a pretested semiconductor light source and a prepackaged and pretested photoresponsive device.

Briefly, and in accordance with one embodiment of this invention, an active opto-electronic transducer comprises a molded body of material having a pair of depressions therein. A semiconductor light source is disposed in a first of the depressions and a photoresponsive device is disposed in the second depression. The depressions are closely spaced and precisely oriented so that, without the need for focusing means, a portion of light emitted by the semiconductor light source and impinging upon an object to be detected is received by the photoresponsive device. The portion of the molded body between the depressions therein serves to prevent direct illumination of the photoresponsive device by the semiconductor light source; accordingly, either the molded body is opaquely pigmented or a coating of opaque material is applied to the surfaces of the depressions.

The novel features of this invention sought to be patented are set forth with particularity in the appended claims. The invention, together with further objects and advantages thereof, may be understood from a reading of the following specification and appended claims in view of the accompanying drawings in which:

FIG. 3 is a sectional elevation view of another embodiment of the transducer of this invention.

Figure 1:
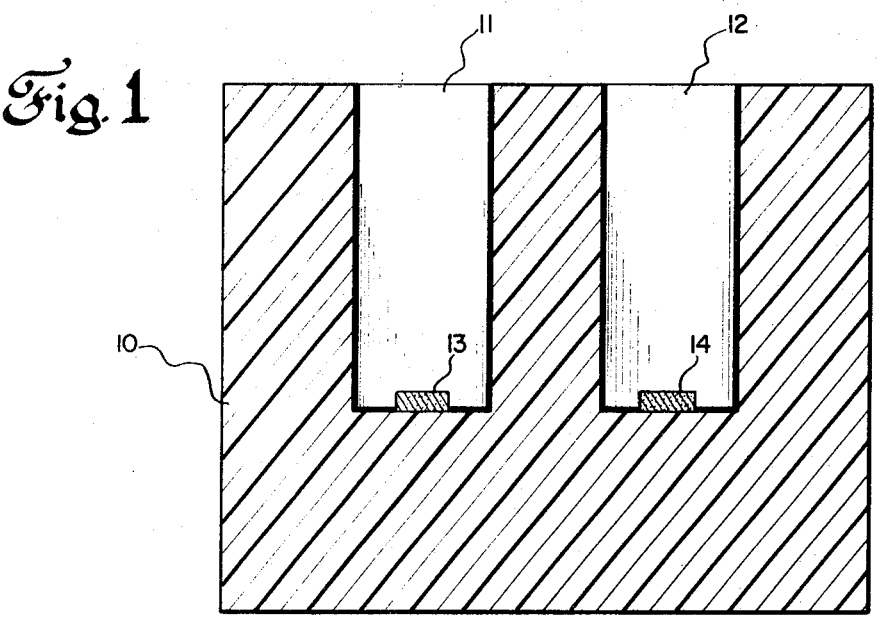
FIG. 1 is a sectional elevation view of a transducer in accordance with this invention.
Figure 2:
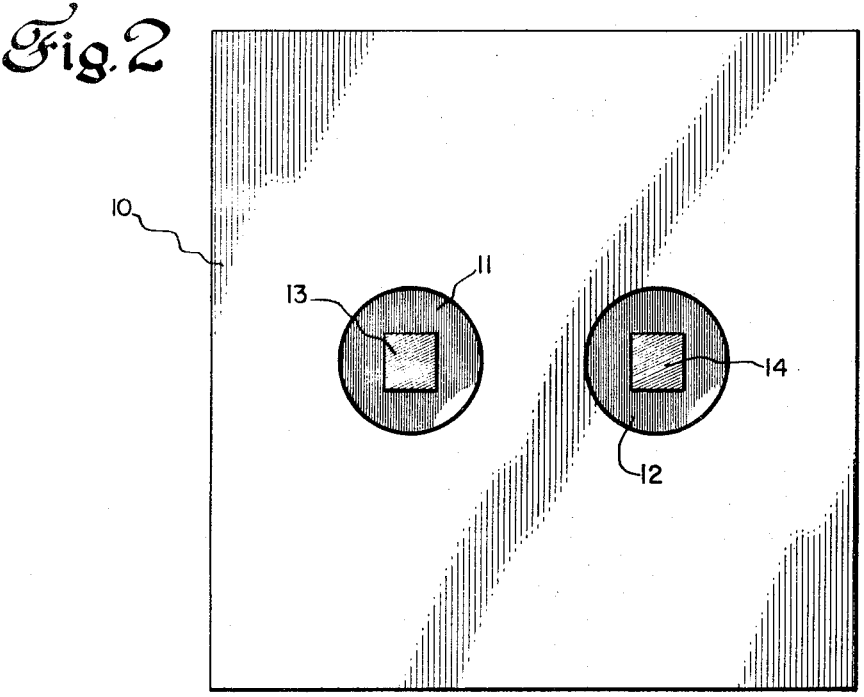
FIG. 2 is a plan view of the transducer of FIG. 1.

FIGS. 1 and 2 are highly enlarged illustrations of a transducer in accordance with this invention comprising a molded member 10 which may conveniently be plastic as, for example, injection molded thermoplastic, having therein a pair of depressions 11 and 12. Member 10 is molded in a precisely manufactured die so that depressions 11 and 12 are dimensionally small, very close together, and essentially parallel. For example, in a useful transducer having depressions of circular cross section, the depressions have diameters on the order of 1/10 inch, depths on the order of one-quarter inch, and nearest edge to nearest edge spacing between depressions 11 and 12 on the order of 50 mils. These dimensions are not critical and this invention is not to be considered so limited; however, for optical and mechanical reasons, dimensions approximating those given are preferable, as will be obvious to one skilled in the art. Similarly, while depressions having circular cross section are convenient, this invention is not so limited and depressions having other cross-sectional shapes may be employed if desired.

A semiconductor light source 13 which may, for example, be a light emitting diode, is positioned, preferably centrally, at the bottom depression 11. A photoresponsive device 14 is similarly positioned at the bottom of depression 12. Photoresponsive device 14 may, for example, be a phototransistor, a photodiode, a photoresistor, or a photoelectric cell. Semiconductor light source 13 and photoresponsive device 14 are provided with electrical leads not shown for, respectively, the provision of operating power and the receiving of an output signal. The leads are preferably conductive wires which are placed in the die prior to the molding of member 10 and may, if desired, be molded along a wall of depressions 11 and 12, or alternatively, may be molded into the body of member 10 and brought out at any convenient surface thereof.

In order to prevent direct illumination of photoresponsive device 14 by light emitted by semiconductor light source 13, member 10 may be molded of a material containing an opaque pigment, or alternatively, an opaque coating may be applied to the walls of depressions 11 and 12.

FIG. 3 illustrates an alternative embodiment of this invention in which molded member 10 having depressions 11 and 12 therein has additionally, channels 17, 18, 19, and 20 molded therein and extending from the bottom surfaces of depressions 11 and 12, through member 10, to a surface thereof. Semiconductor light source 13 having leads 21 and 22 attached thereto, and photoresponsive device 14 having leads 23 and 24 attached thereto, are pre-encapsulated in encapsulations 15 and 16. Encapsulations 15 and 16 are formed of a light transmissive material, preferably a plastic material. As illustrated by encapsulation 15, either or both encapsulations may be formed to perform a light focusing function, if desired. The pre-encapsulated opto-electronic elements are preferably pretested to insure proper operation thereof and are then positioned in the depressions of molded member 10 with their associated leads depending through channels 17, 18, 19, and 20.

While this invention has been described with reference to particular embodiments and examples, other modifications and variations will appear to those skilled in the art in view of the above teachings. Accordingly, it should be understood that within the scope of the appended claims, the invention may be practiced otherwise than is specifically described.

The invention claimed is:

1. An active opto-electronic transducer comprising:

a molded body having a pair of depressions extending from a first surface of said body for a portion of the thickness thereof and a plurality of channels extending from a second surface opposite said first surface of said body into each of said depressions therein, said channels each having a cross section dimension substantially smaller than the corresponding cross section dimension of said depressions;

a semiconductor light source in a first of said depressions, said semiconductor light source having a pair of electrical leads connected thereto and depending through a pair of said channels; and a photoresponsive device in a second of said depressions, said photoresponsive device having a pair of electrical leads connected thereto and depending through a pair of said channels;

at least the portion of said molded body between said depressions being optically opaque and of sufficient height to prevent direct illumination of said photoresponsive device by said semiconductor light source;

whereby said semiconductor light source and said photoresponsive device with said connected leads may be easily inserted into said molded body after the pretesting of said semiconductor light source and said photoresponsive device.

2. The transducer of claim 1 wherein said molded body is optically opaque.

3. The transducer of claim 1 wherein one of said depressions has a coating of optically opaque material on a surface thereof.

4. The transducer of claim 3 wherein each said depression has a coating of optically opaque material on a surface thereof.

5. The transducer of claim 4 wherein said first depression has a coating of optically opaque reflective material on a surface thereof and said second depression has a coating of optically opaque non-reflective material on a surface thereof.

6. The transducer of claim 1 wherein said semiconductor light source and said photoresponsive device are encapsulated in light transmissive material.

7. The transducer of claim 6 wherein said light transmissive material has a curved surface for focusing light.

* * * * *